United States Patent
Huang

(10) Patent No.: US 6,256,138 B1
(45) Date of Patent: Jul. 3, 2001

(54) FIBER FILTER TO IMPROVE RETURN LOSS AT SIGNAL BAND OF A FIBER AMPLIFIER FOR PUMP LASER MODULES

(75) Inventor: Sun-Yuan Huang, Maidencreek Township, Berks County, PA (US)

(73) Assignee: Lucent Technologies Inc, Murray Hill, NJ (US)

( * ) Notice: Subject to any disclaimer, the term of this patent is extended or adjusted under 35 U.S.C. 154(b) by 0 days.

(21) Appl. No.: 09/479,831

(22) Filed: Jan. 7, 2000

(51) Int. Cl.⁷ ........................................... H01S 3/00
(52) U.S. Cl. ........................ 359/337.2; 359/341.3
(58) Field of Search .................................. 359/341, 345, 359/337.2, 341.3

(56) References Cited

U.S. PATENT DOCUMENTS

| 5,161,050 | * | 11/1992 | Grasso et al. | 359/341 |
| 5,640,268 | * | 6/1997 | Chesnoy | 359/341 |
| 5,892,615 | * | 4/1999 | Grubb et al. | 359/341 |
| 5,923,462 | * | 7/1999 | van der Plaats | 359/341 |
| 6,038,061 | * | 3/2000 | Sugaya | 359/337 |

* cited by examiner

Primary Examiner—Mark Hellner
(74) Attorney, Agent, or Firm—Darby & Darby

(57) ABSTRACT

A fiber filter for use in an optical amplifier communication system is in the form of an optical fiber connected between a laser pump module and an amplifier. In one preferred embodiment, the optical fiber is configured to have a predetermined loop diameter to attenuate light in the signal band of the amplifier. The cutoff wavelength, the diameter of the loop, and the number of loops may also be selected to attenuate the signal light sufficiently in the signal band of the amplifier.

16 Claims, 5 Drawing Sheets

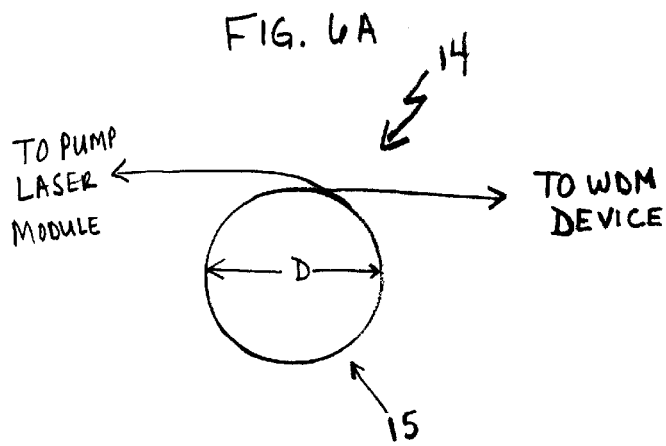
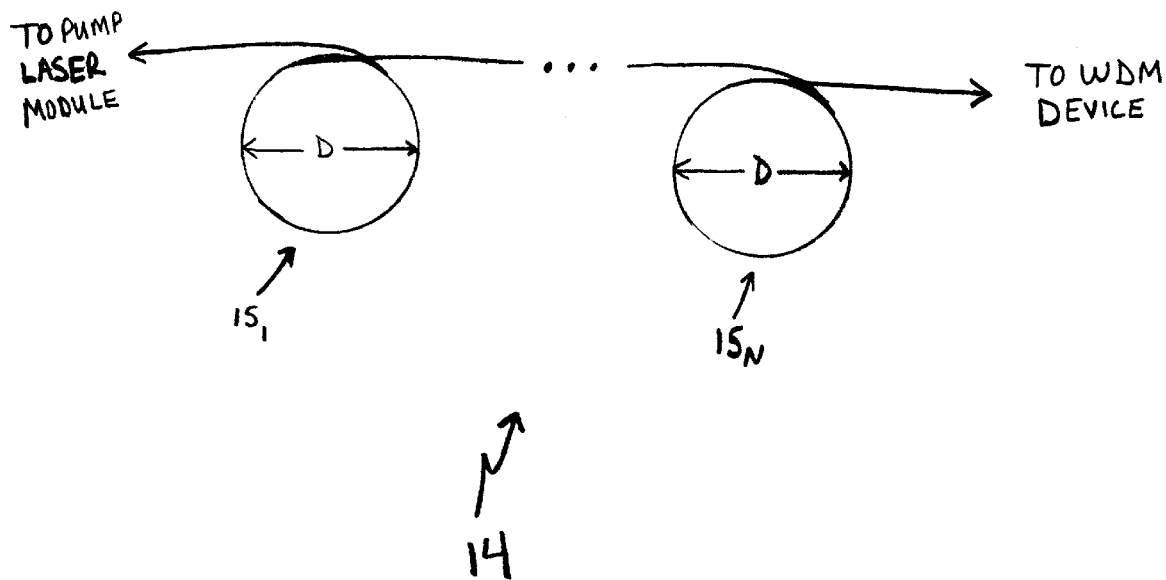

FIBER FILTER TO IMPROVE RETURN LOSS AT SIGNAL BAND OF A FIBER AMPLIFIER FOR PUMP LASER MODULES

FIELD OF INVENTION

The present invention generally relates to wavelength-dependent fiber filters and, more particularly, to a fiber filter used for optical amplification communication systems, for example, Dense Wavelength Division Multiplexing (WDM) systems.

BACKGROUND OF THE INVENTION

Pump lasers have gained widespread acceptance and have become an indispensable component for use in modem fiber amplifier communication systems. As is well known to those skilled in the art, the pump laser generates pump light which is transmitted to a fiber amplifier. The fiber amplifier absorbs the pump light energy, and uses the absorbed energy to amplify an input signal that is then transmitted over an optical line to an intended site.

One particular pump laser which is widely used is a 980 nanometer (nm) pump laser, due to its high electrical-to-optical conversion efficiency and the low noise figure of its amplifier. The pump laser module typically includes a pump laser chip, coupling optics and/or fiber grating. The coating for the laser facets and the optical elements is typically designed for 980 nm wavelengths, to substantially prevent, if not eliminate, reflection of those wavelengths.

One amplifier used in these pump lasers is an Erbium-Doped Fiber Amplifier (EDFA), which typically has a signal wavelength of between 1530 to 1610 nm. Thus, the coating used for the optical elements is often not suited for these wavelengths, resulting in a high reflection of the signal wavelengths within the pump laser module. In addition, the EDFA is often operated in very high gain conditions, such that it generates a considerable amount of amplified spontaneous emissions (ASE) in the wavelength band (1530–1610 nm). Because the coating is not suited for those wavelengths, the ASE can leak through the wavelength-division-multiplexing (WDM) device and is reflected back to the EDFA by the laser pump module. The reflected ASE power causes a degradation of the noise figure for the EDFA.

In order to overcome this problem, others have used a WDM device with a high degree of isolation from the common port to the pump module port at the signal wavelength. While such an arrangement has proven somewhat effective, a less stringent alternative would be an improvement.

Therefore, the need exists for a system which improves the return loss within the signal band of the EDFA, and which is less stringent than prior solutions.

SUMMARY OF THE INVENTION

Accordingly, it is an object of the present invention to provide a method and system for improving the return loss of an optical amplifier communication system, without the need for additional components or for a stringent arrangement of the existing components.

Briefly, the present invention includes a fiber filter in the form of an optical fiber connected between a laser pump module and an amplifier. In one preferred embodiment, the optical fiber is configured to have a predetermined loop diameter to attenuate signals in the wavelength band of the amplifier.

According to another embodiment of the invention, the fiber filter is selected to have a predetermined cutoff wavelength to improve the return signal loss, and is preferably bent into a predetermined loop diameter.

The system of the present invention in one illustrative embodiment includes: a pump laser module that is operative to generate pump light; a wavelength-division-multiplexing device connected to the pump laser module and to a signal input to multiplex the pump light and signal light; a fiber amplifier connected to the wavelength-division-multiplexing device, the amplifier being operative to absorb the pump light and to amplify the signal light; and a fiber filter interposed between the pump laser module and the wavelength-division multiplexing device, the fiber filter being operative to attenuate signals in a predetermined wavelength band corresponding with amplified spontaneous emissions created by the amplifier.

BRIEF DESCRIPTION OF THE DRAWINGS

The foregoing and other features of the present invention will be more readily apparent from the following detailed description and drawings of illustrative embodiments of the invention in which:

FIG. 6A is a schematic diagram of a single loop fiber filter incorporated into the system of FIG. 1; and FIG. 6B is a schematic diagram of a multiple loop fiber filter incorporated into the system of FIG. 1.

DETAILED DESCRIPTION OF THE INVENTION

Figure 1:
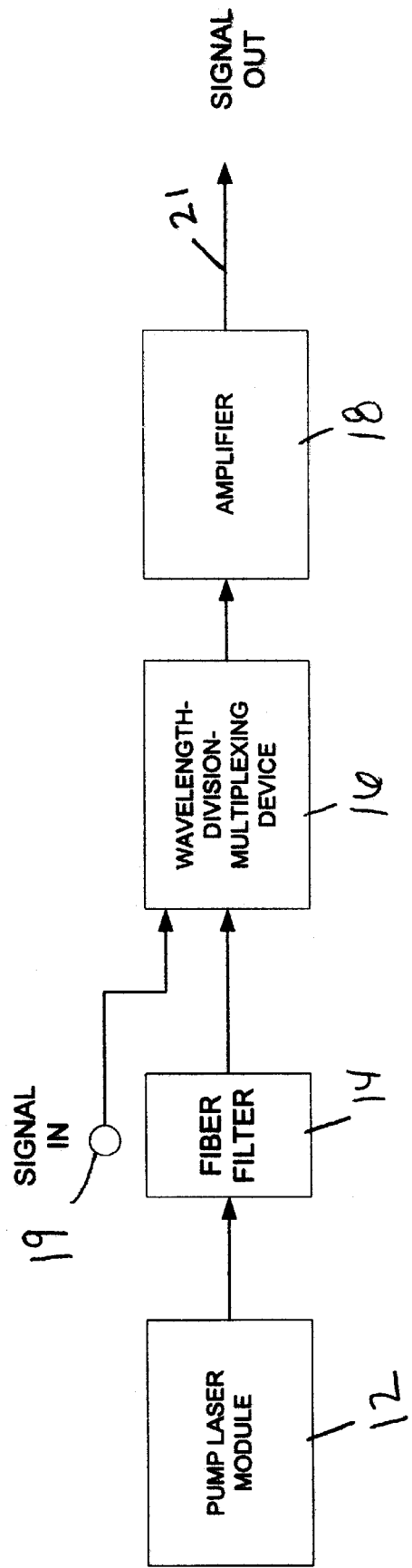
FIG. 1 is a block diagram of an optical amplifier communication system according to one illustrative embodiment of the invention.

Referring now to the drawings in more detail, an optical amplifier communication system 10 according to one illustrative embodiment of the invention is shown in FIG. 1. The system includes a pump laser module 12, an optical filter 14, a wavelength-division-multiplexing (WDM) device 16, and an amplifier 18. The pump laser module may be a conventional module, which preferably includes a pump laser chip, coupling optics and/or fiber grating, as is well known to those skilled in the art. The pump laser module is operative to generate a laser light output, which is preferably transmitted to the WDM device, which multiplexes the incoming laser light with the signal light from a signal source 19. The multiplexed signal is then transmitted to the amplifier, where the laser light is absorbed and the signal light is amplified and sent over an optical line 21 to its intended destination.

The pump laser module 12 according to one illustrative embodiment comprises a 980 nm pump laser module. Thus, the coating for the laser facets and optical elements is preferably selected to substantially prevent reflection of optical signals having wavelengths of 980 nm.

In one illustrative embodiment, the amplifier 18 is an EDFA, which generates signals having wavelengths between about 1530 and 1610 nm. The EDFA is preferably operated at a very high gain condition, and as a result, a considerable amount of amplified spontaneous emission (ASE) is generated. The ASE can pass along the optical fibers through the WDM device to the pump laser module. Because the coating is often not optimized for the wavelengths generated by the EDFA, the ASE will often be reflected back by the pump module 12, thereby significantly degrading the noise figure of the EDFA.

According to the present invention, the optical filter 14 is provided to attenuate the ASE that may be generated by the EDFA. The filter includes a specially designed and configured optical fiber which attenuates certain wavelengths, while allowing other wavelengths to pass through without loss, as is now described in greater detail with respect to certain examples of illustrative embodiments.

Figure 2:
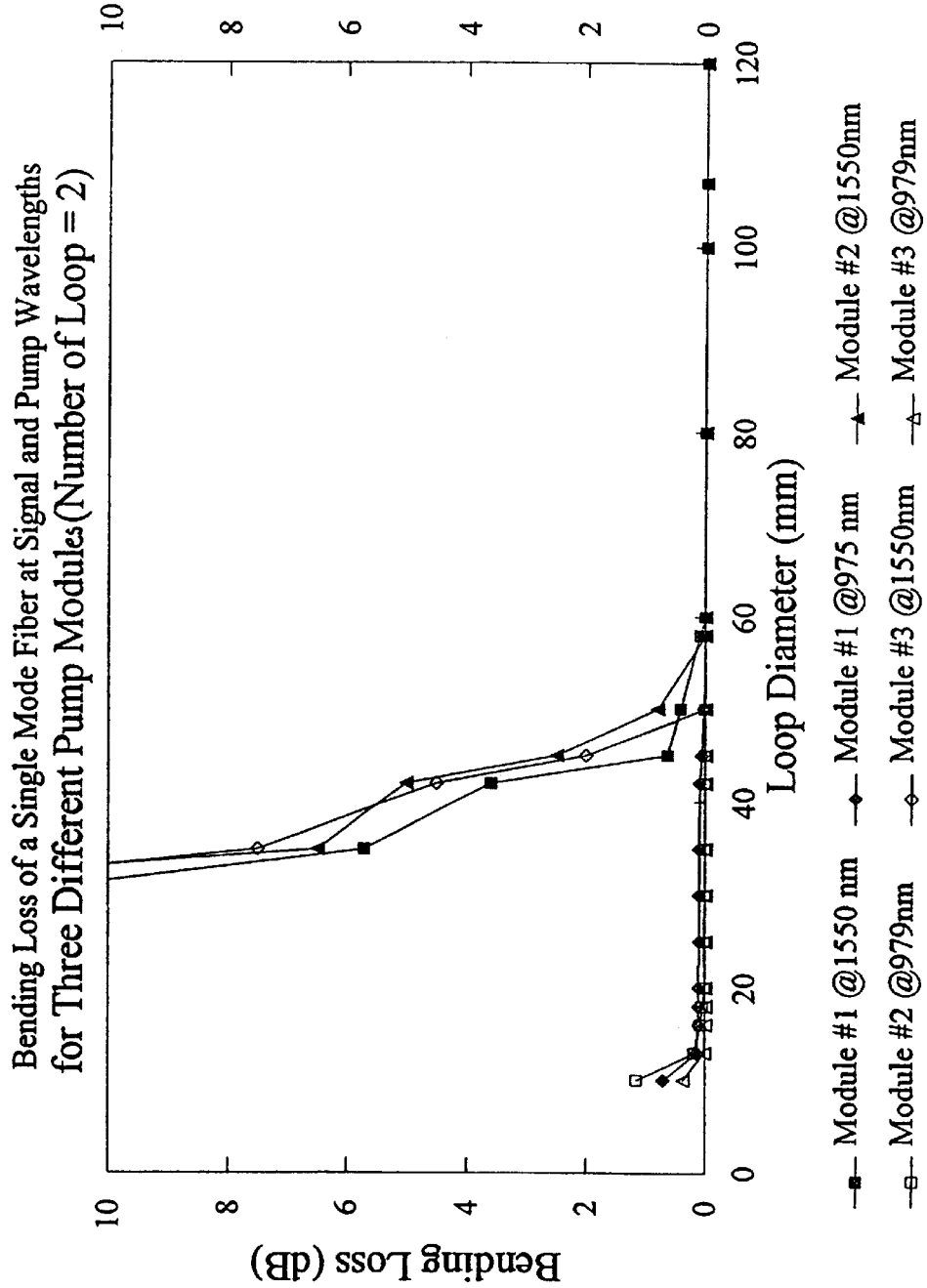
FIG. 2 is a graph of bending loss as a function of loop diameter at both pump and signal wavelengths for a fiber filter included in the system of FIG. 1.

According to one illustrative embodiment, the optical filter 14 is in the form of a single mode optical fiber bent into a single loop 15 having a selected loop diameter D (FIG. 6A). The loop diameter is selected based upon the desired loss and the wavelength of the signal that is to be attenuated. As an example, FIG. 2 shows the signal attenuation ("bending loss"), in decibels (dB), of a single mode fiber as a function of loop diameter for both 980 nm pump and 1550 nm signal light. For the 1550 nm signal light, the bending loss starts to increase in dBs when the loop diameter decreases below about 60 millimeters. For the 980 nm light, the bending loss does not start to increase in dBs until the loop diameter decreases below about 14 mm. Therefore, if the filter 14 is intended to allow the pump light to pass through without attenuation, while at the same time attenuating the ASE signal from the EDFA, the optical fiber is preferably bent into a loop having a loop diameter of between about 14 and about 60 mm. Obviously, for other signal wavelengths, the loop diameter will vary. However, it will be apparent that the system of the present invention can be used with different pump modules and EDFAs that generate various signal wavelengths, by merely altering the loop diameter of the filter 14.

Figure 3A:
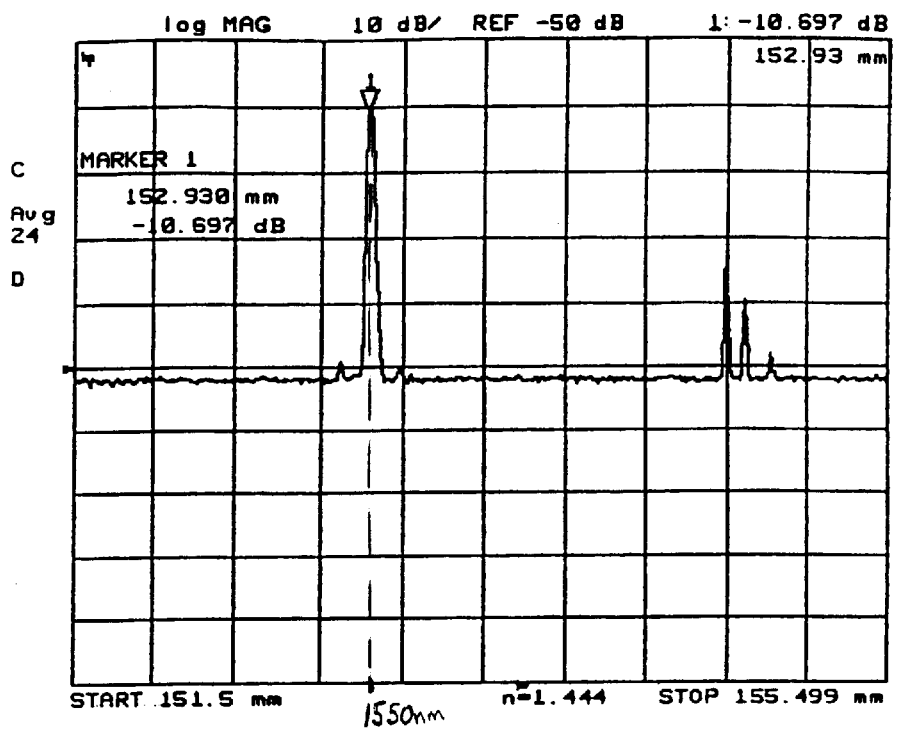
FIG. 3A is a graph of return loss for an optical amplifier communication system which does not include the fiber filter of the present invention.
Figure 3B:
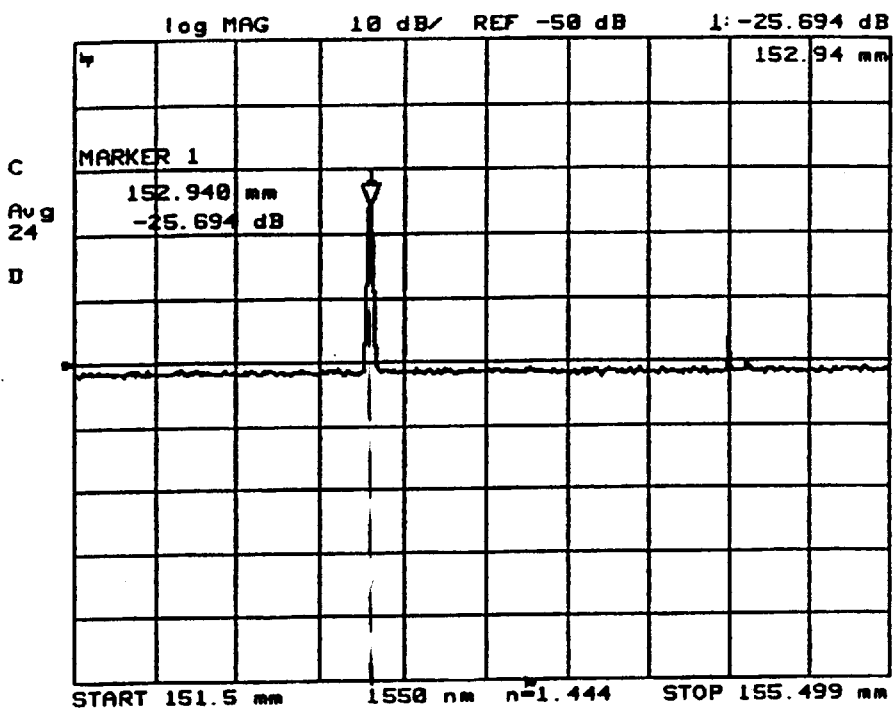
FIG. 3B is a graph of return loss for an optical amplifier communication system that incorporates the fiber filter of the present invention.

Referring now to FIGS. 3A, 3B and 6B, there is shown an example of improved return loss for a two-loop fiber filter (see FIG. 6B where N=2) versus a fiber having no loops. As is shown in FIG. 3A, a straight fiber having no loops has a return loss of only 10.7 dB for 1550 nm light. In other words, a relatively large amount of the 1550 nm light passes through the straight fiber and back from the pump laser module 12. In FIG. 3B, on the other hand, the return loss increases to 25.7 dB for a filter having a loop diameter of 35 mm and two loops of fiber. As is shown in FIG. 3B, the two-loop filter improves the return loss by about 15 dB (i.e., the signal is more significantly attenuated by the two-loop fiber filter as compared with the no-loop fiber). Thus, the amount of 1550 nm light is significantly reduced by the fiber filter, as is shown by the decreased amplitude of the 1550 nm light in FIG. 3B as compared with FIG. 3A.

Figure 4:
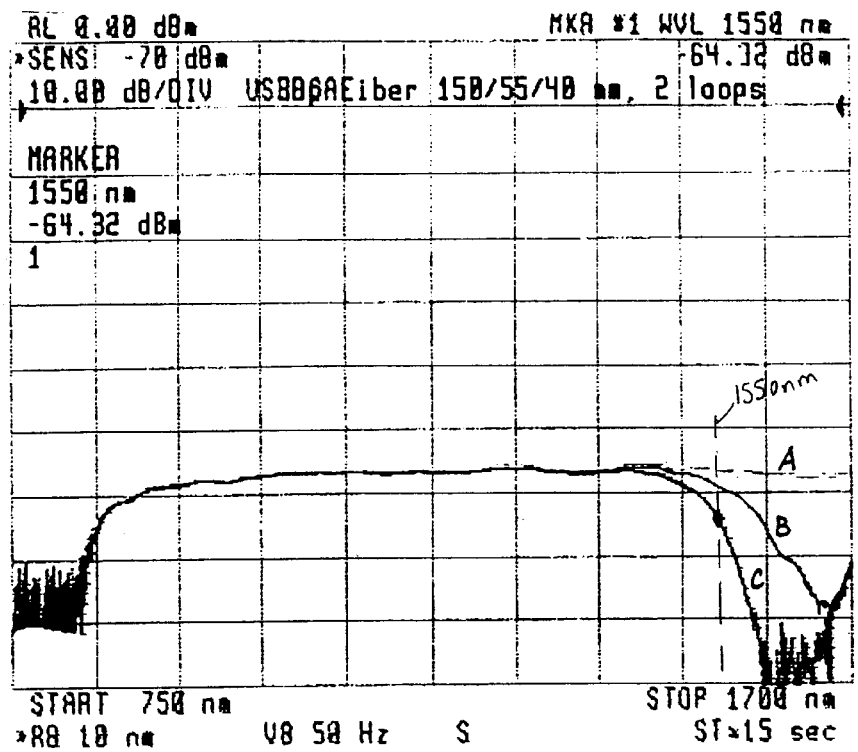
FIG. 4 is a graph of transmission spectra of a single mode fiber filter having a cutoff wavelength of 863 nm and with varying loop diameters.

In addition to altering the loop diameter of the optical filter 14 to attenuate certain wavelengths, it has been determined that signal light can also be attenuated by selecting a single mode fiber which has a preselected cutoff wavelength. As is well known in the art, the cutoff frequency of a fiber can be altered by changing the reflective index difference between the core of the fiber and the surrounding coating, for example, by changing the doping concentration to vary the cutoff frequency. As one example, FIG. 4 is a graph of bending losses for a single mode fiber with a cutoff wavelength of 863 nm. Curve A shows the bending losses for a fiber with a loop diameter of 150 mm, which are approximately the same as those for a straight fiber. Curve B shows the bending losses for a loop diameter of 55 mm and shows a bending loss of 2.59 dB at 1550 nm. And curve C shows the bending losses for a loop diameter of 40 mm and shows a bending loss of 7.60 dB at 1550 nm, and with the losses starting at shorter wavelengths than for the loop diameter of 55 mm. Thus, it will be apparent to those skilled in the art that, depending on the wavelength to be attenuated, the loop diameter can be varied.

Figure 5:
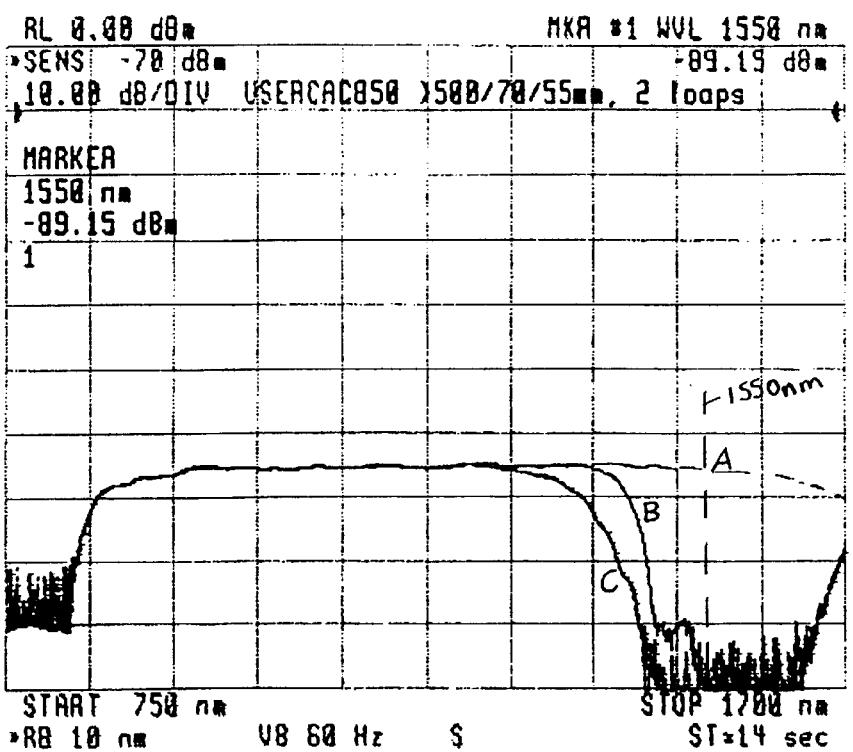
FIG. 5 is a graph of transmission spectra of a single mode fiber filter having a cutoff wavelength of 750 nm and with varying loop diameters.

Referring now to FIG. 5, there is shown the transmission spectra of a single mode fiber filter 14 with a cutoff wavelength of 750 nm. Curve A is for a straight fiber, curve B is for a filter with a loop diameter of 70 mm, and curve C is for a fiber with a loop diameter of 55 mm. At 1550 nm, the fiber with a 70 mm loop diameter has a bending loss of 33 dB, and the fiber with a 55 mm loop diameter has a bending loss of about 45 dB. Thus, by merely lowering the cutoff wavelength of the fiber, much larger bending losses can be achieved with the same or even larger loop diameters. For example, at 70 mm loop diameter, the bending loss increases from 0 dB to 33 dB when the cutoff wavelength changes from 863 nm to 750 nm. At 55 mm loop diameter, the relationship between the cutoff wavelength and the bending loss can be expressed as:

$L = m(863 \text{ nm} - \lambda c) + 2.59 \text{ dB}$ where m is 0.39 dB/nm. Thus, in order to improve the return loss by 20 dB with one loop of fiber, the fiber should be selected with a cutoff wavelength of 818 nm.

It will also be apparent to those skilled in the art that the return loss can be increased by altering the number of loops of fiber used in the filter 14. The propagation loss, in dB, can be expressed as 4.34 $\alpha$L, where $\alpha$ is the attenuation coefficient and L is the fiber length. Therefore, the return loss increases linearly with the number of loops. For example, at a loop diameter of 55 mm, the return loss can be improved by 2.59 dB at 1550 nm for a single loop of fiber having a cutoff wavelength of 863 nm (when including the round-trip nature of the return loss). Thus, for ten loops of fiber having a loop diameter of 55 mm, the return loss is 25.9 dB.

Thus, it will be apparent to those skilled in the art that the filter 14 can be designed to attenuate certain undesirable signals by selecting one or more of the cutoff wavelength, the loop diameter, and the number of loops.

From the foregoing, it will be apparent to those skilled in the art that the present invention provides a novel system and method for attenuating certain wavelengths in an optical amplifier communication system, while allowing the desired wavelengths to pass through without attenuation. The present invention achieves this result without the need for stringent isolation requirements or any additional components.

Having thus described illustrative embodiments of the present invention, it is to be understood that the above described arrangement and system is merely illustrative of the principles of the present invention, and that other arrangements and systems may be devised by those skilled in the art without departing from the spirit and scope of the invention as claimed below.

What is claimed is:

1. An optical communication system comprising:
   a pump laser module that is operative to generate pump light;

a wavelength-division-multiplexing device connected to the pump laser module and to a signal source supplying signal light;

a fiber amplifier connected to the wavelength-division-multiplexing device, the amplifier being operative to absorb the pump light and to amplify the signal light; and a fiber filter having a predetermined cutoff wavelength at a frequency below a predetermined wavelength band interposed between the pump laser module and the wavelength-division multiplexing device, the fiber filter being operative to attenuate signals in said predetermined wavelength band and to allow the pump light to pass without significant attenuation.

2. The system of claim 1, wherein the fiber filter comprises a fiber arranged in a loop having a predetermined loop diameter which has a bending loss at frequencies in said predetermined wavelength band and passes light at the pump light frequencies without significant attenuation.

3. The system of claim 1, wherein the fiber filter comprises a fiber arranged in a predetermined number of loops, and which has a bending loss in each loop at frequencies in said predetermined wavelength band and an overall bending loss which in the fiber filter amounts to said bending loss in each loop multiplied by the number of loops.

4. The system of claim 1, wherein the fiber filter comprises a fiber having a predetermined cutoff wavelength at a frequency below said predetermined wavelength band and arranged in at least one loop of a predetermined loop diameter which has a bending loss in said predetermined wavelength.

5. The system of claim 2 wherein the wavelength band is between about 1530 and 1610 nanometers, the pump light is in the range of 980 nanometers, and wherein the loop diameter ranges between about 14 and about 60 millimeters.

6. The system of claim 3, wherein the fiber is arranged in at least two loops.

7. An optical communication system comprising:

a pump laser module that is operative to generate pump light;

a wavelength-division-multiplexing device connected to the pump laser module and to a signal source supplying signal light;

a fiber amplifier connected to the wavelength-division-multiplexing device, the amplifier being operative to absorb the pump light and to amplify the signal light; and a fiber filter interposed between the pump laser module and the wavelength-division multiplexing device, the fiber filter comprising a fiber having at least one of a predetermined cutoff wavelength at a frequency below a predetermined wavelength band, a predetermined loop diameter, and a predetermined number of loops, to attenuate signals in said predetermined wavelength band and to allow the pump light to pass without significant attenuation.

8. The system of claim 7, wherein the fiber filter comprises a fiber arranged in a loop having a predetermined loop diameter which has a bending loss at frequencies in said predetermined wavelength band and passes light at the pump light frequencies without significant attenuation.

9. The system of claim 7, wherein the fiber filter comprises a fiber arranged in a predetermined number of loops, and which has a bending loss in each loop at frequencies in said predetermined wavelength band and an overall bending loss which in the fiber filter amounts to said bending loss in each loop multiplied by the number of loops.

10. The system of claim 7, wherein the fiber filter comprises a fiber having a predetermined cutoff wavelength at a frequency below said predetermined wavelength band and arranged in at least one loop of a predetermined loop diameter which has a bending loss in said predetermined wavelength.

11. The system of claim 8 wherein the wavelength band is between about 1530 and 1610 nanometers, the pump light is in the range of 980 nanometers, and wherein the loop diameter ranges between about 14 and about 60 millimeters.

12. The system of claim 10, wherein the fiber is arranged in at least two loops.

13. A fiber filter having a predetermined cutoff wavelength at a frequency below a predetermined wavelength band for use in an optical communication system to attenuate amplified spontaneous emissions in a predetermined signal band and to allow pump light to pass without attenuation, the fiber filter comprising at least one loop of fiber having a predetermined loop diameter to attenuate signals in the predetermined signal band and to allow the pump light to pass without significant attenuation.

14. The fiber filter of claim 13, wherein the fiber filter comprises a fiber having a predetermined cutoff wavelength at a frequency below said predetermined wavelength band.

15. A fiber filter having a predetermined cutoff wavelength at a frequency below a predetermined wavelength band for use in an optical communication system to attenuate amplified spontaneous emissions in a predetermined signal band and to allow pump light from a laser pump module to pass without attenuation, the fiber filter comprising at least one loop of fiber having a predetermined cutoff wavelength at a frequency below the predetermined wavelength band to attenuate signals in the predetermined signal band and to allow the pump light to pass without significant attenuation.

16. The fiber filter of claim 15, wherein the fiber is arranged to have a predetermined loop diameter.

* * * * *